(12) United States Patent
Chien et al.

(10) Patent No.: US 9,819,874 B2
(45) Date of Patent: Nov. 14, 2017

(54) CAMERA COLOR TEMPERATURE COMPENSATION SYSTEM AND SMART TERMINAL EMPLOYING SAME

(71) Applicant: Chiun Mai Communication Systems, Inc., New Taipei (TW)

(72) Inventors: How-Wen Chien, New Taipei (TW); Kai-Chun Chang, New Taipei (TW); Yi-Yun Hung, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 64 days.

(21) Appl. No.: 14/954,995

(22) Filed: Nov. 30, 2015

(65) Prior Publication Data
US 2017/0054960 A1    Feb. 23, 2017

(30) Foreign Application Priority Data

Aug. 17, 2015  (CN) .......................... 2015 1 0503457

(51) Int. Cl.
| | |
|---|---|
| *H04N 5/235* | (2006.01) |
| *G02B 15/02* | (2006.01) |
| *H04N 5/225* | (2006.01) |
| *H04N 5/232* | (2006.01) |
| *G03B 15/02* | (2006.01) |

(52) U.S. Cl.
CPC ........... *H04N 5/2354* (2013.01); *G03B 15/02* (2013.01); *H04N 5/2256* (2013.01); *H04N 5/2257* (2013.01); *H04N 5/2258* (2013.01); *H04N 5/23293* (2013.01)

(58) Field of Classification Search
CPC .. H04N 5/2256; H04N 5/2257; H04N 5/2258; H04N 5/2354; H04N 5/23293; H04N 9/045; H04N 9/735
See application file for complete search history.

(56) References Cited

U.S. PATENT DOCUMENTS

| | | | |
|---|---|---|---|
| 7,539,407 B2* | 5/2009 | Maeda ................... | G03B 15/05 348/371 |
| 8,515,275 B2* | 8/2013 | Machida ................. | G03B 7/16 348/371 |

(Continued)

*Primary Examiner* — Daniel M Pasiewicz
(74) *Attorney, Agent, or Firm* — Steven Reiss

(57) ABSTRACT

A camera color temperature compensation system includes a first camera module, a second camera module, a light-emitting element unit, a controller, and a processor. The second camera module detects environmental parameters. The light-emitting element unit includes at least one light-emitting element and is arranged adjacent to the first camera module or the second camera module. The controller adjusts emitting strength of the at least one light-emitting element. The processor triggers the controller to adjust emitting strength of the at least one light-emitting element according to the environmental parameters detected by the second camera module. The emitting strength of the at least one light-emitting element is adjusted to adjust a brightness and a color temperature of environment. The first camera module captures images in the adjusted brightness and the adjusted color temperature. A smart terminal employing the camera color temperature compensation system is also provided.

20 Claims, 4 Drawing Sheets

(56) References Cited

U.S. PATENT DOCUMENTS

| | | | |
|---|---|---|---|
| 2004/0263634 A1* | 12/2004 | Kiuchi | H04N 1/00347 348/207.99 |
| 2006/0067667 A1* | 3/2006 | Kita | H04N 5/2256 396/180 |
| 2006/0067668 A1* | 3/2006 | Kita | G03B 15/05 396/182 |
| 2008/0175579 A1* | 7/2008 | Kawakami | G03B 15/03 396/155 |
| 2012/0281109 A1* | 11/2012 | Komiya | H04N 9/045 348/223.1 |
| 2013/0033581 A1* | 2/2013 | Woo | H04N 13/0239 348/47 |
| 2014/0071330 A1* | 3/2014 | Zhang | H04N 5/2258 348/345 |
| 2014/0265878 A1* | 9/2014 | Gritti | H04B 10/116 315/153 |
| 2014/0272764 A1* | 9/2014 | Miller | A61B 1/0684 433/27 |
| 2015/0009360 A1* | 1/2015 | Takasumi | H04N 9/735 348/223.1 |
| 2015/0054001 A1* | 2/2015 | Oganesian | H04N 5/2256 257/82 |
| 2015/0092066 A1* | 4/2015 | Geiss | H04N 5/2258 348/180 |
| 2015/0116534 A1* | 4/2015 | Kim | H04N 1/6027 348/223.1 |
| 2015/0304542 A1* | 10/2015 | Jansen | B41F 33/0036 358/2.1 |
| 2016/0088278 A1* | 3/2016 | Velarde | H04N 9/735 348/371 |
| 2016/0205301 A1* | 7/2016 | Park | H04N 5/2256 348/211.2 |
| 2016/0323518 A1* | 11/2016 | Rivard | H04N 5/247 |

* cited by examiner

CAMERA COLOR TEMPERATURE COMPENSATION SYSTEM AND SMART TERMINAL EMPLOYING SAME

FIELD

The subject matter herein generally relates to a camera color temperature compensation system, and particularly relates to a camera color temperature compensation system for directly adjusting color temperature and brightness and a smart terminal employing the camera color temperature compensation system.

BACKGROUND

It's difficult to determine a white balance for portable smart terminal with camera module taking pictures in different light sources, which may make the pictures including color deviation. Normally, the portable smart terminal may include software configured to adjust the color temperature of the pictures. However, the color temperature was adjusted after the pictures were taken, which may affect an authenticity of the pictures.

BRIEF DESCRIPTION OF THE DRAWINGS

Implementations of the present technology will now be described, by way of example only, with reference to the attached figures.

DETAILED DESCRIPTION

Figure 1:
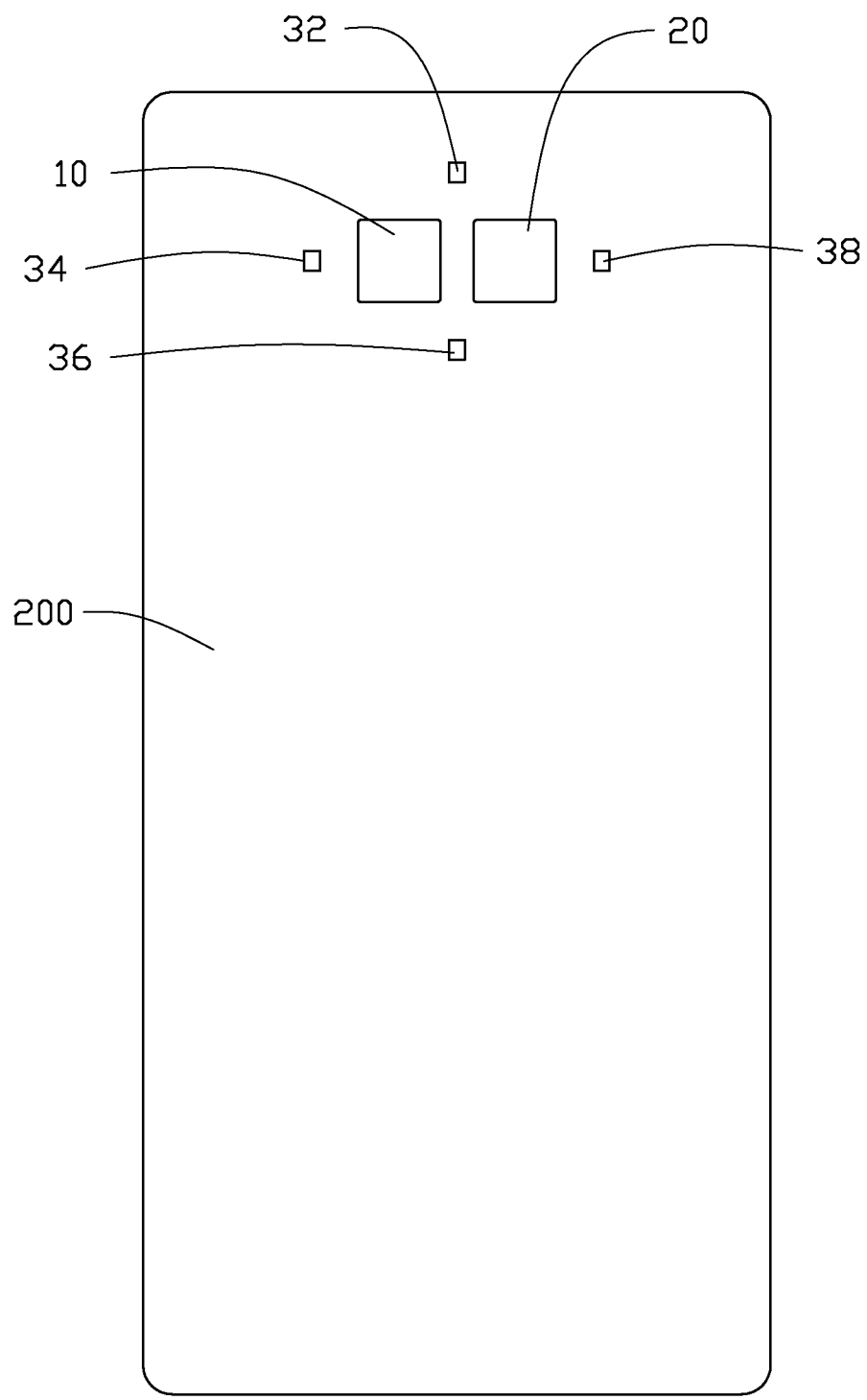
FIG. 1 is a diagrammatic view of a first embodiment of a smart terminal including a camera color temperature compensation system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

Figure 2:
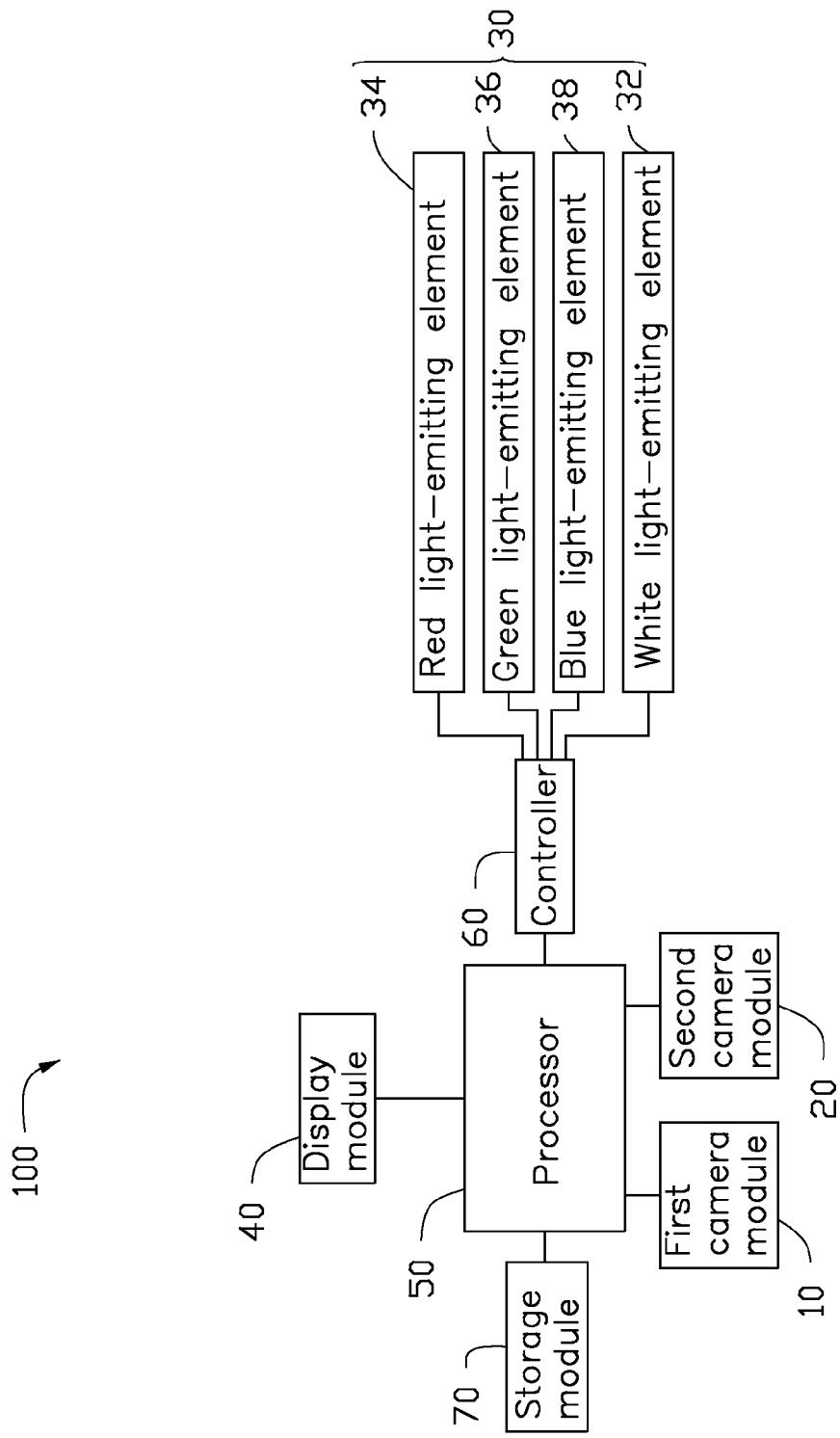
FIG. 2 is a block diagram of the camera color temperature compensation system.

FIGS. 1 and 2 illustrate an embodiment of a smart terminal 200 including a camera color temperature compensation system 100. The smart terminal 200 can be a smart phone, a tablet computer, or a personal digital assist. The camera color temperature compensation system 100 includes a first camera module 10, a second camera module 20, a light-emitting element unit 30, a display module 40, a processor 50, a controller 60, and a storage module 70.

The first camera module 10 and the second camera module 20 are symmetrically arranged on the smart terminal 200. In at least one embodiment, the first camera module 10 and the second camera module 20 are horizontally arranged on the smart terminal 200. The first camera module 10 is configured to capture images. The second camera module 20 is configured to detect environmental parameters associated with the environment of the smart terminal 200. In at least one embodiment, the environmental parameters include white balance and brightness.

The light-emitting element unit 30 is configured to compensate a brightness and color temperature of the environment. In at least one embodiment, the light-emitting element unit 30 includes a white light-emitting element 32, a red light-emitting element 34, a green light-emitting element 36 and a blue light-emitting element 38. The white light-emitting element 32 is configured to adjust a brightness of the environment. The red light-emitting element 34, the green light-emitting element 36 and the blue light-emitting element 38 are configured to cooperatively adjust a color temperature of the environment. In at least one embodiment, the white light-emitting element 32, the red light-emitting element 34, the green light-emitting element 36 and the blue light-emitting element 38 surround the first camera module 10 and the second camera module 20, thus, light emitted by the light-emitting elements may cover a capture range of the first camera module 10 and the second camera module 20.

The display module 40 is configured to display previews and images captured by the first camera module 10 and display a user interface for being operated to achieve a human-computer interaction. In at least one embodiment, the display module 40 is a touch screen.

The processor 50 is configured to process image signals captured by the first camera module 10 and the second camera module 20 and present the image signals to the smart terminal 200. In at least one embodiment, the processor 50 includes image signal process circuit configured to process linear correction, noise removal, white balance correction, and brightness correction. The processor 50 triggers the controller 60 to adjust emitting strengths of the light-emitting elements according to the detected environmental parameters, thereby adjusting the color temperature and brightness of the environment.

The controller 60 is configured to control the emitting strength of each of the white light-emitting element 32, the red light-emitting element 34, the green light-emitting element 36 and the blue light-emitting element 38.

The storage module 70 is configured to store images captured by the first camera module 10, a predetermined standard white balance parameter for capturing images, and a predetermined standard brightness parameter for capturing images, etc.

When the camera color temperature compensation system 100 captures images, operation modes can be selected by the user interface of the display module 40. In at least one embodiment, an automatic operation mode, a manual operation mode, and an automatic plus manual operation mode can be selected.

In the automatic operation mode, the first camera module 10 and the second camera module 20 are activated simultaneously. The first camera module 10 captures a preview of the environment and transmits image signals of the preview to the processor 50. The second camera module 20 detects environmental parameters associated with the environment of the smart terminal 200 and transmits the environmental parameters to the processor 50. The processor 50 controls the display module 40 to display the preview image. Meanwhile, the processor 50 compares the environmental parameters detected by the second camera module 20 to the predetermined environmental parameters stored in the storage module 70 to determine a parameter differentia. The predetermined environmental parameters include a predetermined standard white balance parameter and a predetermined standard brightness parameter. The processor 50 further triggers the controller 60 to adjust the emitting strength of each of the light-emitting element according to the parameter differentia. The controller 60 adjusts the emitting strengths of the white light-emitting element 32, the red light-emitting element 34, the green light-emitting element 36 and the blue light-emitting element 38, respectively, to perform light filling and white balance correction in the environment in order to adjust the brightness and the color temperature of the environment such that the environmental parameters detected by the second camera module 20 conform to the predetermined environmental parameters. Thus, the first camera module 10 can capture images (such as preview images or regular images) with predetermined standard brightness and predetermined standard color temperature and display the images (such as preview images or regular images) captured in the adjusted brightness and the adjusted color temperature of the environment on the display module 40. The first camera module 10 can store the images captured in the adjusted brightness and the adjusted color temperature to the storage module 70.

Figure 3:
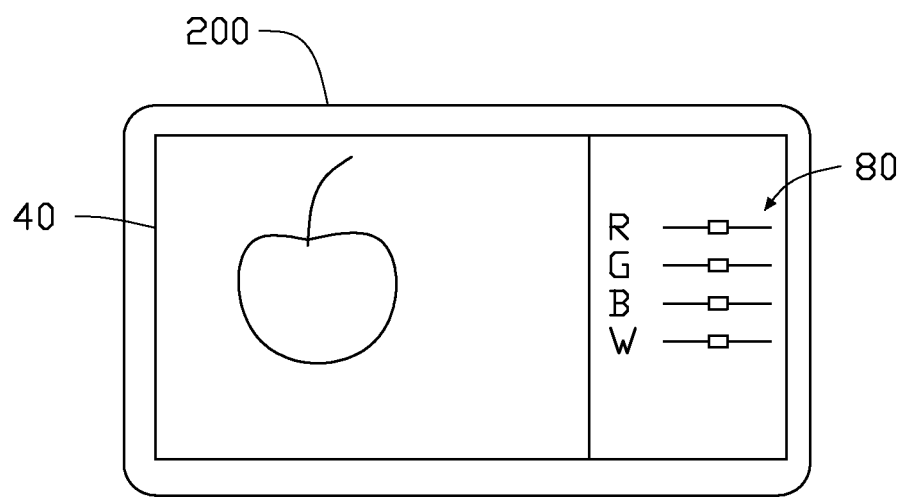
FIG. 3 is a block diagram of a display module of the camera color temperature compensation system in a manual operation mode.

In the manual operation mode, referring to FIGS. 2 and 3, the first camera module 10 captures a preview of the environment and transmits image signals of the preview to the processor 50. The second camera module 20 detects environmental parameters associated with the environment and transmits the environmental parameters to the processor 50. The processor 50 displays the preview image and the environmental parameters on the display module 40. The display module 40 further displays adjustment options corresponding to the white light-emitting element 32, the red light-emitting element 34, the green light-emitting element 36 and the blue light-emitting element 38, such as the adjustment options 80 configured to be manually operated to adjust (increase or decrease) the emitting strength of each light-emitting element. In at least one embodiment, the display module 40 displays the preview on one side and the adjustment options 80 on the other side. User of the smart terminal 200 can slide each adjustment options 80 to the right or to the left to increase or decrease the emitting strength of the corresponding light-emitting element, thus to trigger the controller 60 to control the corresponding light-emitting element to emit light with corresponding emitting strength. For instance, a user preferring red environment can slide the adjustment option 80 corresponding to the red light-emitting element 34 to increase the emitting strength, thereby triggering the controller 60 to increase the emitting strength of the red light-emitting element 34 to light up the environment with more red light. Similarly, the user can operate the adjustment options 80 corresponding to the other light-emitting elements to light up the environment with preferred brightness and preferred color temperature. After the manual adjustment through the adjustment options 80, the first camera module 10 can capture a preview in the manually adjusted brightness and the manually adjusted color temperature and then displays the preview on the display module 40. Then the first camera module 10 captures an image in the manually adjusted brightness and the manually adjusted color temperature and stores the image to the storage module 70.

In the automatic plus manual operation mode, the camera color temperature compensation system 100 adjusts brightness and color temperature of the environment to the predetermined brightness and the predetermined color temperature as in the automatic operation mode, and then the display module 40 displays the adjustment options 80 corresponding to the light-emitting elements. User can further slide the adjustment options 80 to trigger the controller 60 to adjust the emitting strengths of the light-emitting elements to achieve various preferable brightness and color temperature of the environment. For instance, the user may slide the adjustment option 80 corresponding to the green light-emitting element 36 to increase the emitting strength of the green light by 0.2 unit, slide the adjustment option 80 corresponding to the blue light-emitting element 38 to decrease the emitting strength of the blue light by 0.15 unit, and keeps the emitting strengths of the white light-emitting element 32 and the red light-emitting element 34 unchanged, thereby triggering the controller 60 to increase the corresponding emitting strength of the green light-emitting element 36 and decrease the corresponding emitting strength of the blue light-emitting element 38 to achieve the brightness and color temperature that the user expects. Then the first camera module 10 captures an image in the adjusted brightness and the adjusted color temperature of the environment and stores the image to the storage module 70.

Figure 4:
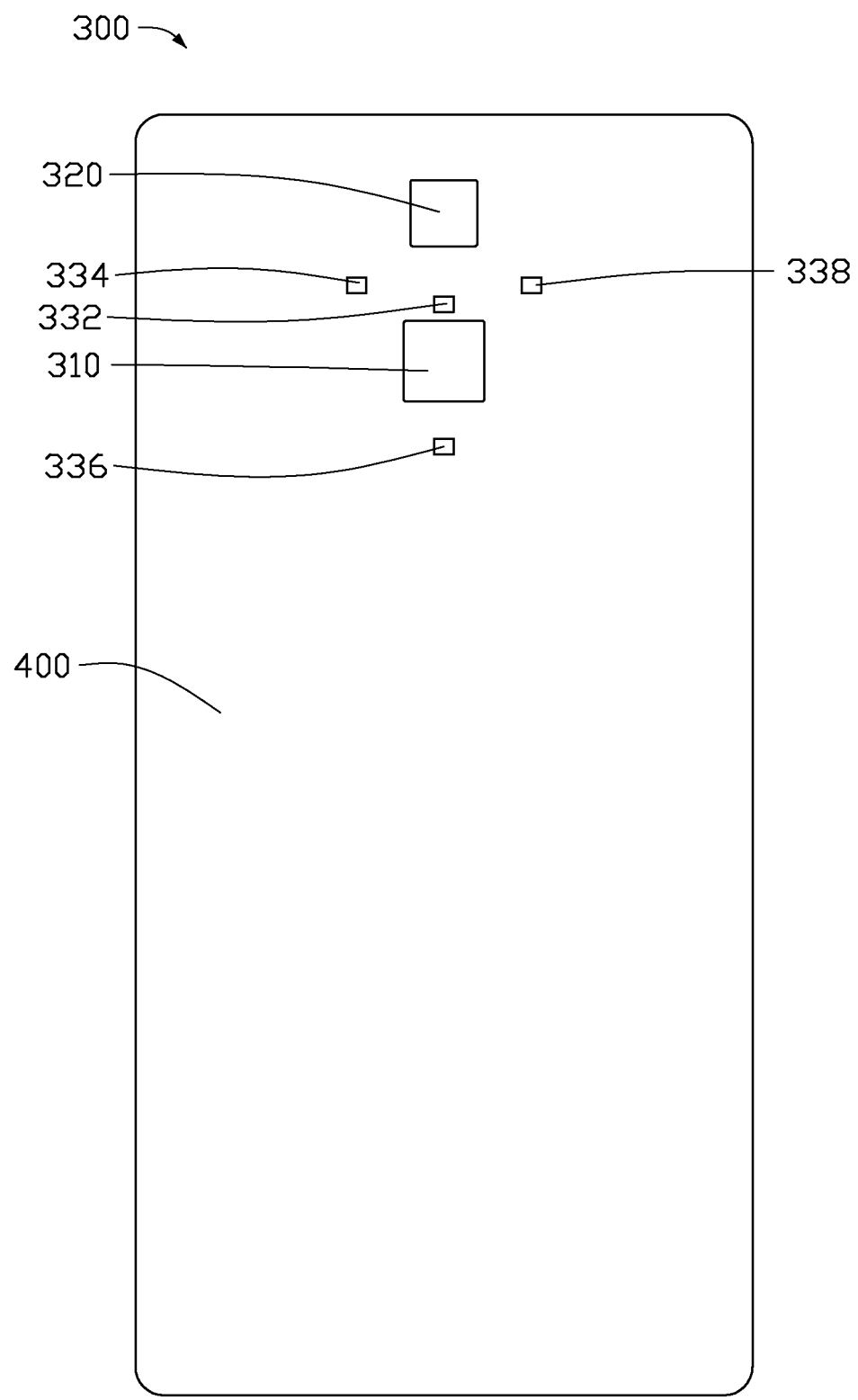
FIG. 4 is a diagrammatic view of a second embodiment of the smart terminal including the camera color temperature compensation system.

FIG. 4 illustrates a second embodiment of a camera color temperature compensation system 300 including a first camera module 310, a second camera module 320, a white light-emitting element 332, a red light-emitting element 334, a green light-emitting element 336 and a blue light-emitting element 338. The first camera module 310 and the second camera module 320 are vertically arranged on the smart terminal 400. The white light-emitting element 332, the red light-emitting element 334, the green light-emitting element 336 and the blue light-emitting element 338 surround the first camera module 310, and the white light-emitting element 332 is arranged between the first camera module 310 and the second camera module 320.

In other embodiments, the camera color temperature compensation system 100 may only include the first camera module 10 configured to detect environmental parameters, provide previews to the display module 40, and capture images in adjusted brightness and adjusted color temperature.

In other embodiments, the camera color temperature compensation system 100 may include the first camera module 10 and the second camera module 20. The second camera module 20 is configured to detect environmental parameters. The number of pixels of the second camera module 20 is lower than that of the first camera module 10, which is to increase process speed of the camera color temperature compensation system 100. The first camera module 10 is configured to capture images with more pixels to keep quality of the images.

In other embodiments, the storage module 70 is further configured to store optical parameters of the first camera module 10 and the second camera module 20. For instance, penetration wave length parameters of optical lens and photoelectric conversion parameters of pixels of photosensitive components. When the first camera module 10 captures images, the processor 50 may further adjust the brightness and color temperature of the environment for the first camera module 10 according to the optical parameters.

The camera color temperature compensation system 100 detects environmental parameters via the second camera module 20 and adjusts emitting strength of each of the light-emitting elements via the controller 60, thus to adjust brightness and color temperature of the environment where images are captured, which helps to improve authenticity and quality of the images.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A camera color temperature compensation system applied in a smart terminal, the camera color temperature compensation system comprising:
   a first camera module configured to provide a preview of an environment;
   a second camera module configured to detect environmental parameters associated with the environment;
   a light-emitting element unit comprising at least one light-emitting element arranged adjacent to the first camera module or the second camera module;
   a controller configured to adjust emitting strength of the at least one light-emitting element; and
   a processor configured to trigger the controller to adjust the emitting strength of the at least one light-emitting element according to the environmental parameters detected by the second camera module;
   wherein the emitting strength of the at least one light-emitting element is adjusted to adjust a brightness and a color temperature of the environment, the first camera module captures an image in the adjusted brightness and the adjusted color temperature of the environment; and
   wherein the at least one light-emitting element comprises a white light-emitting element, a red light-emitting element, a green light-emitting element, and a blue light-emitting element, and wherein the white light-emitting element, the red light-emitting element, the green light-emitting element and the blue light-emitting element surround the first camera module, and the white light-emitting element is arranged between the first camera module and the second camera module.

2. The camera color temperature compensation system as claimed in claim 1, wherein the white light-emitting element is configured to adjust the brightness of the environment, the red light-emitting element, the green light-emitting element, and the blue light-emitting element are configured to adjust the color temperature of the environment.

3. The camera color temperature compensation system as claimed in claim 2, wherein the first camera module and the second camera module are horizontally arranged.

4. The camera color temperature compensation system as claimed in claim 2, wherein the first camera module and the second camera module are vertically arranged.

5. The camera color temperature compensation system as claimed in claim 2, further comprising a storage module configured to store images captured by the first camera module, a predetermined standard white balance parameter for capturing the images, and a predetermined standard brightness parameter for capturing the images.

6. The camera color temperature compensation system as claimed in claim 5, further comprising a display module configured to display the images captured by the first camera module and display a user interface for being operated to achieve a human-computer interaction.

7. The camera color temperature compensation system as claimed in claim 6, wherein the processor compares the environmental parameters detected by the second camera module to the predetermined standard white balance parameter and the predetermined standard brightness parameter stored in the storage module to determine a parameter differentia, then triggers the controller to adjust emitting strengths of the white light-emitting element, the red light-emitting element, the green light-emitting element and the blue light-emitting element to adjust the brightness and the color temperature of the environment, the display module displays the image captured in the adjusted brightness and the adjusted color temperature of the environment, the first camera module saves the image captured in the adjusted brightness and the adjusted color temperature of the environment to the storage module.

8. The camera color temperature compensation system as claimed in claim 7, wherein the display module displays adjustment options corresponding to the white light-emitting element, the red light-emitting element, the green light-emitting element and the blue light-emitting element for being manually operated to correspondingly adjust emitting strengths of the white light-emitting element, the red light-emitting element, the green light-emitting element and the blue light-emitting element.

9. The camera color temperature compensation system as claimed in claim 6, wherein the display module displays adjustment options corresponding to the white light-emitting element, the red light-emitting element, the green light-emitting element and the blue light-emitting element for being manually operated to correspondingly adjust emitting strengths of the white light-emitting element, the red light-emitting element, the green light-emitting element and the blue light-emitting element, thus to adjust the brightness and the color temperature of the environment, the display module displays the image captured in the adjusted brightness and the adjusted color temperature of the environment, the first camera module saves the image captured in the adjusted brightness and the adjusted color temperature of the environment to the storage module.

10. The camera color temperature compensation system as claimed in claim 5, wherein the storage module is further configured to store optical parameters of the first camera module and the second camera module and the processor is configured to further adjust the brightness and the color temperature of the environment according to the optical parameters.

11. A smart terminal comprising:
    a camera color temperature compensation system comprising:
    a first camera module configured to provide a preview of an environment;
    a second camera module configured to detect environmental parameters associated with the environment;
    a light-emitting element unit comprising at least one light-emitting element arranged adjacent to the first camera module or the second camera module;
    a controller configured to adjust emitting strength of the at least one light-emitting element; and
    a processor configured to trigger the controller to adjust the emitting strength of the at least one light-emitting element according to the environmental parameters detected by the second camera module;
    wherein the emitting strength of the at least one light-emitting element is adjusted to adjust a brightness and a color temperature of the environment, the first camera module captures an image in the adjusted brightness and the adjusted color temperature of the environment; and wherein the at least one light-emitting element comprises a white light-emitting element, a red light-emitting element, a green light-emitting element, and a blue light-emitting element, and wherein the white light-emitting element, the red light-emitting element, the green light-emitting element and the blue light-emitting element surround the first camera module, and the white light-emitting element is arranged between the first camera module and the second camera module.

12. The smart terminal as claimed in claim 11, wherein the white light-emitting element is configured to adjust the brightness of the environment, the red light-emitting element, the green light-emitting element, and the blue light-emitting element are configured to adjust the color temperature of the environment.

13. The smart terminal as claimed in claim 12, wherein the first camera module and the second camera module are horizontally arranged.

14. The smart terminal as claimed in claim 12, wherein the first camera module and the second camera module are vertically arranged.

15. The smart terminal as claimed in claim 12, further comprising a storage module configured to store images captured by the first camera module, a predetermined standard white balance parameter for capturing the images, and a predetermined standard brightness parameter for capturing the images.

16. The smart terminal as claimed in claim 15, further comprising a display module configured to display the images captured by the first camera module and display a user interface for being operated to achieve a human-computer interaction.

17. The smart terminal as claimed in claim 16, wherein the processor compares the environmental parameters detected by the second camera module to the predetermined standard white balance parameter and the predetermined standard brightness parameter stored in the storage module to determine a parameter differentia, then triggers the controller to adjust emitting strengths of the white light-emitting element, the red light-emitting element, the green light-emitting element and the blue light-emitting element, thus to adjust the brightness and the color temperature of the environment, the display module displays the image captured in the adjusted brightness and the adjusted color temperature of the environment, the first camera module saves the image captured in the adjusted brightness and the adjusted color temperature of the environment to the storage module.

18. The smart terminal as claimed in claim 17, wherein the display module displays adjustment options corresponding to the white light-emitting element, the red light-emitting element, the green light-emitting element and the blue light-emitting element for being manually operated to correspondingly adjust emitting strengths of the white light-emitting element, the red light-emitting element, the green light-emitting element and the blue light-emitting element.

19. The smart terminal as claimed in claim 16, wherein the display module displays adjustment options corresponding to the white light-emitting element, the red light-emitting element, the green light-emitting element and the blue light-emitting element for being manually operated to correspondingly adjust emitting strengths of the white light-emitting element, the red light-emitting element, the green light-emitting element and the blue light-emitting element, thus to adjust the brightness and the color temperature of the environment, the display module displays the image captured in the adjusted brightness and the adjusted color temperature of the environment, the first camera module saves the image captured in the adjusted brightness and the adjusted color temperature of the environment to the storage module.

20. The smart terminal as claimed in claim 15, wherein the storage module is further configured to store optical parameters of the first camera module and the second camera module and the processor is configured to further adjust the brightness and the color temperature of the environment according to the optical parameters.

* * * * *